Aug. 20, 1929.   S. STRAUSS   1,725,314
MACHINE FOR MAKING SHOES
Filed April 17, 1922   6 Sheets-Sheet 1

INVENTOR.
Samuel Strauss
BY
ATTORNEYS.

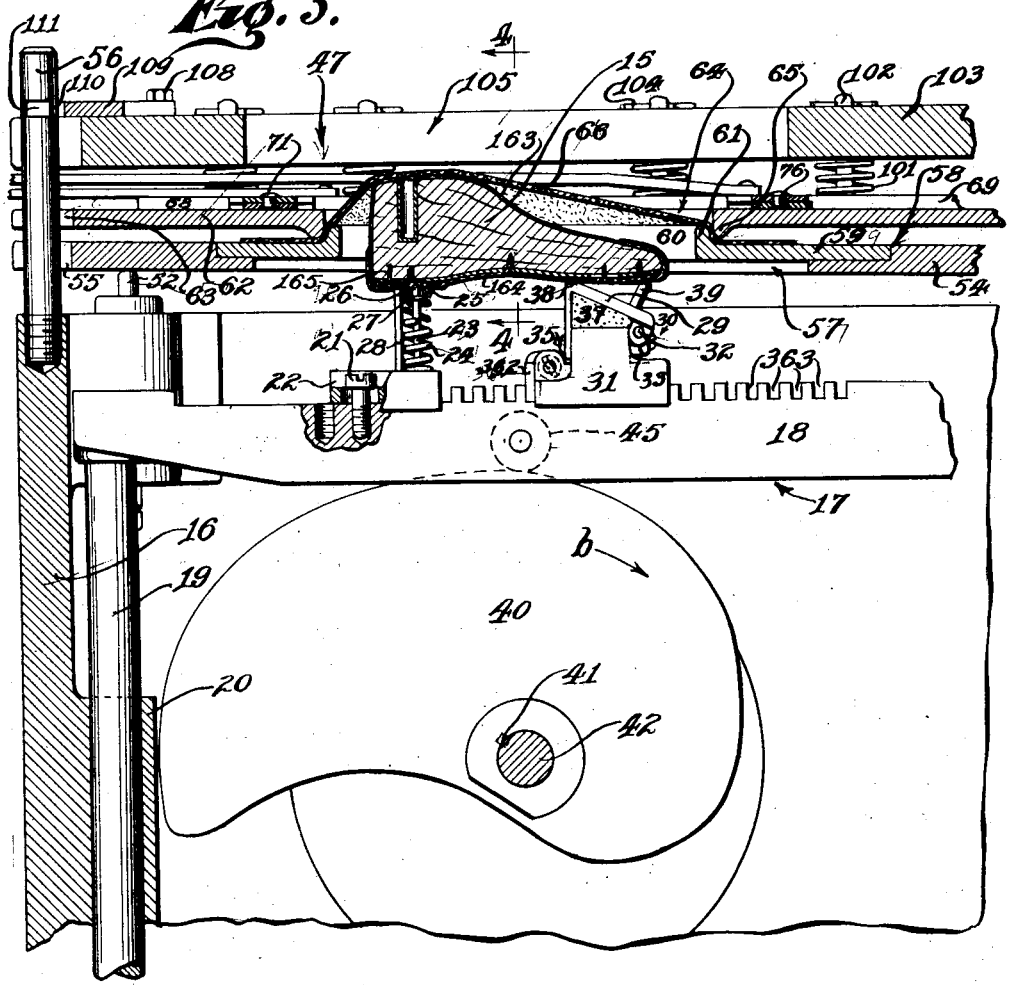
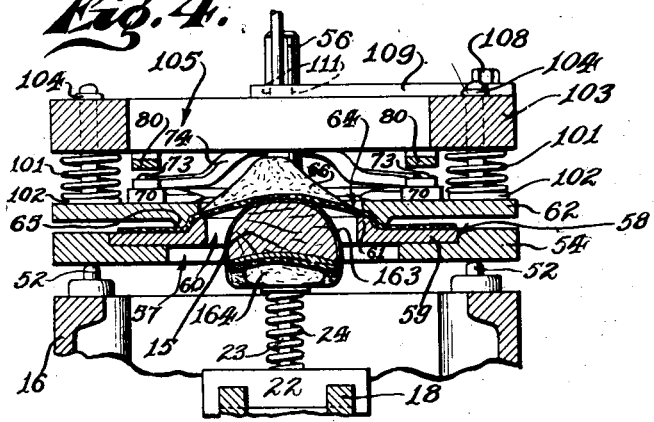

Aug. 20, 1929.  S. STRAUSS  1,725,314
MACHINE FOR MAKING SHOES
Filed April 17, 1922  6 Sheets-Sheet 3
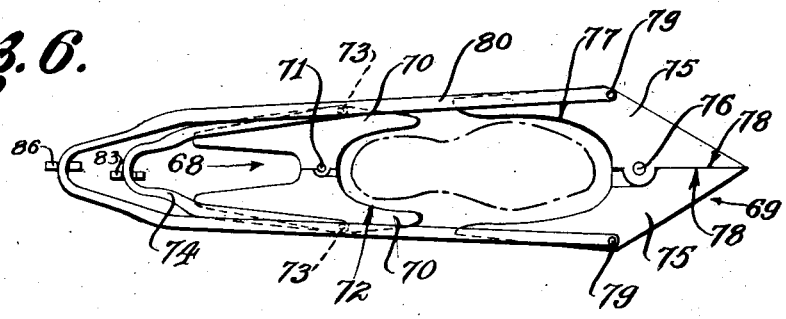
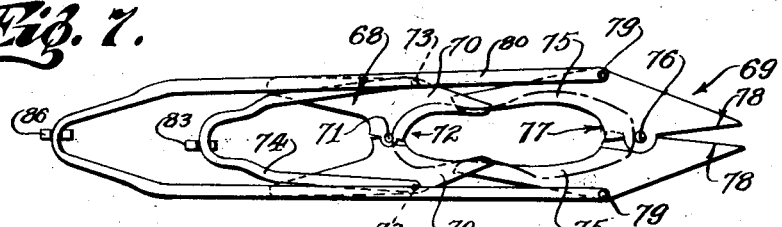
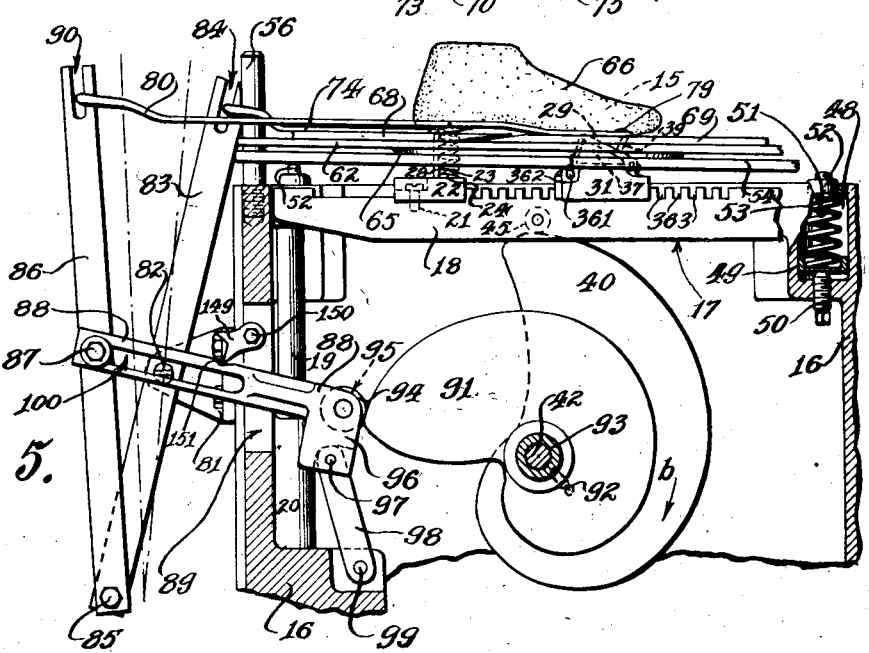
INVENTOR.
Samuel Strauss
BY Lyon & Lyon
ATTORNEYS.

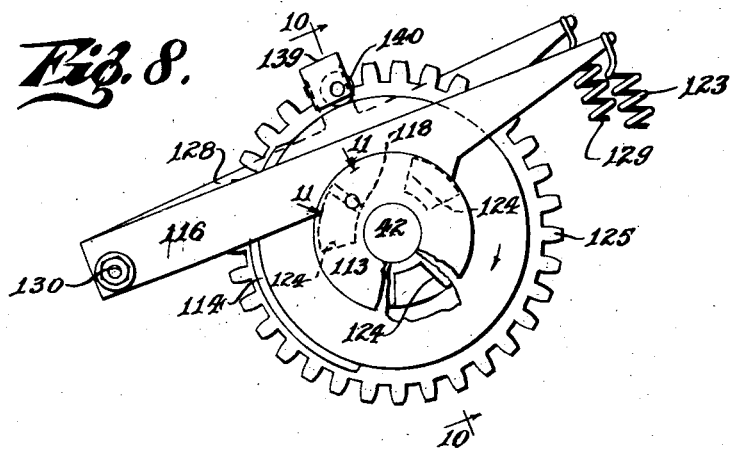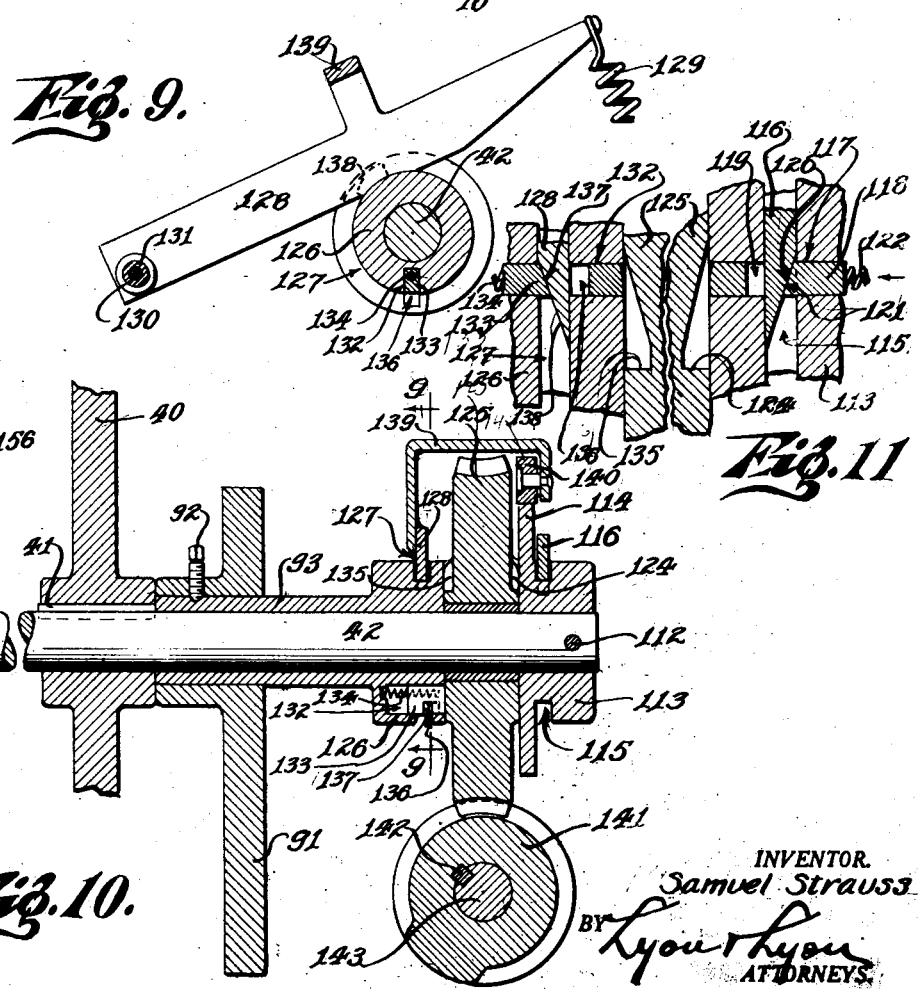

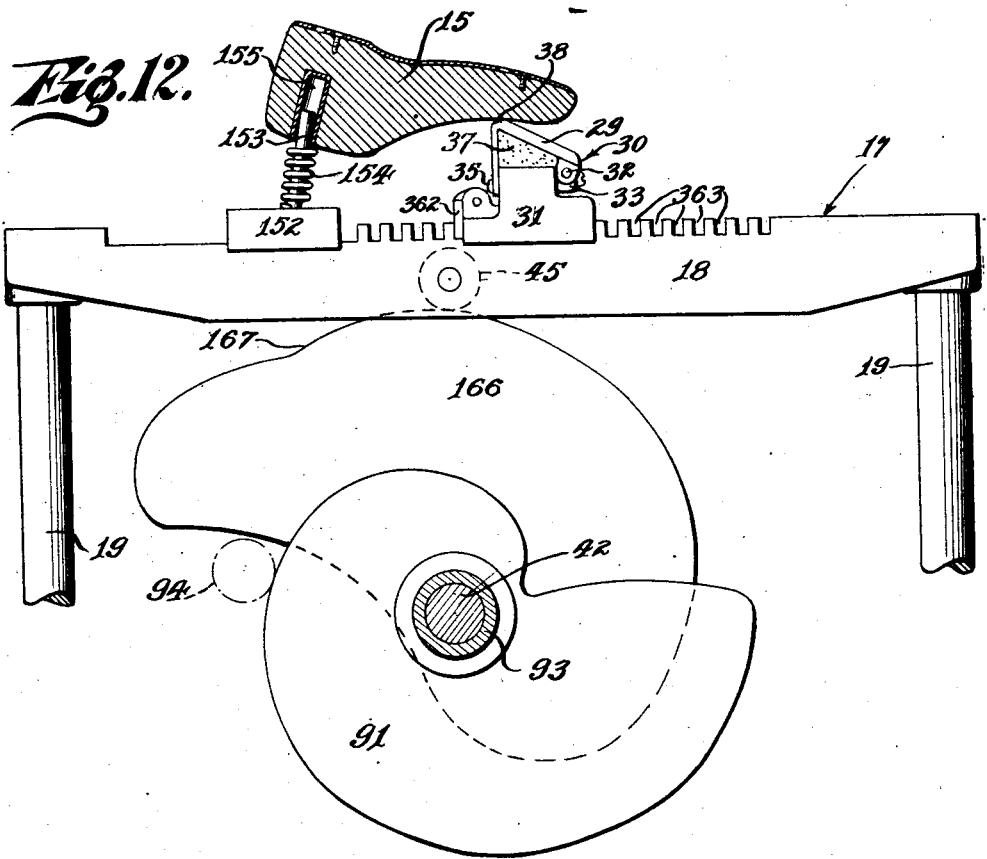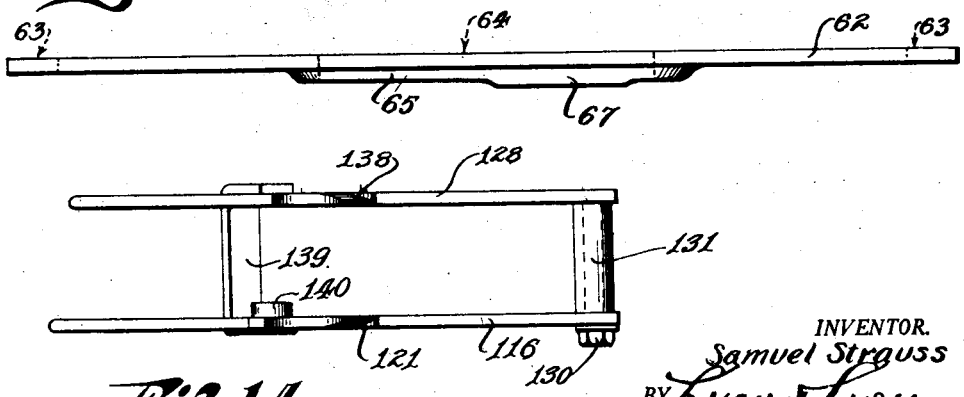

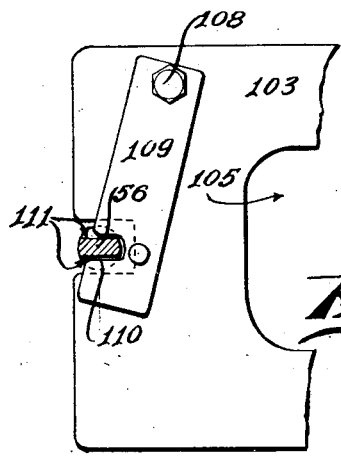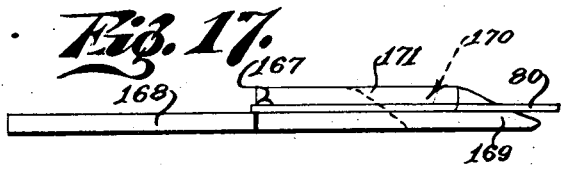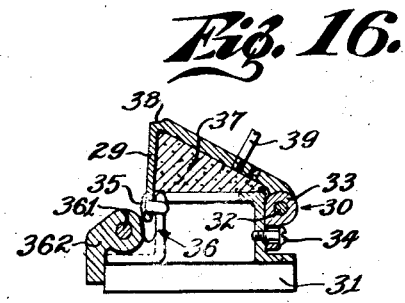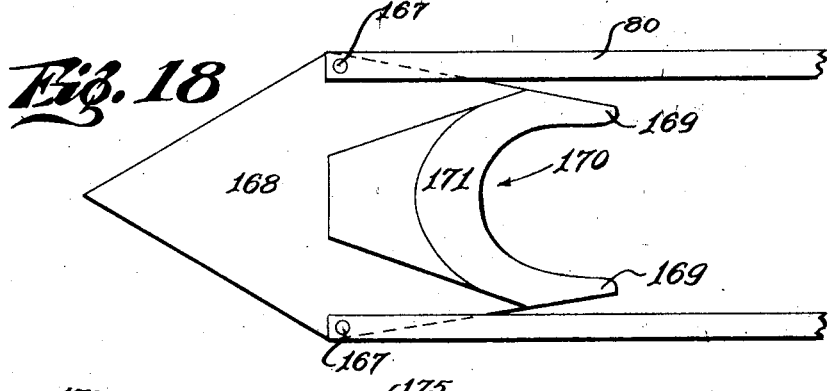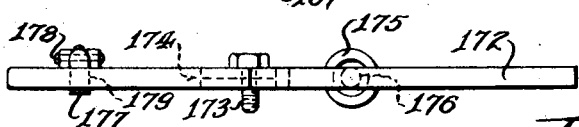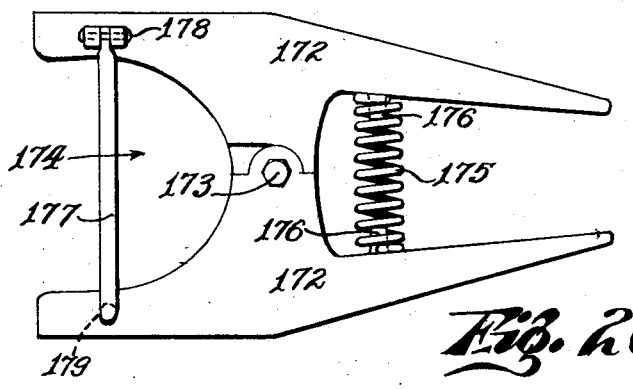

Patented Aug. 20, 1929.

1,725,314

UNITED STATES PATENT OFFICE.

SAMUEL STRAUSS, OF LOS ANGELES, CALIFORNIA.

MACHINE FOR MAKING SHOES.

Application filed April 17, 1922. Serial No. 553,847.

This invention relates to the manufacture of shoes and more especially to that type of shoe having an upper devoid of seams, and an object of the invention is to make a shoe of this description that will conform exactly to the last upon which it is molded.

Another object of the invention is to provide for pulling and stretching the leather or other material, employed in making the shoe, around the last so as to make it conform closely to the shape of the last.

Another object is to make an automatic shoe machine that will produce seamless-upper shoes in a minimum amount of time so as to maximize the output of the machine.

Other objects and advantages will be noted in the subjoined detailed description.

The accompanying drawings illustrate the invention.

Fig. 3 is an enlarged fragmental elevation, mainly in section on the line indicated by 3—3, Fig. 1.

Fig. 4 is a fragmental sectional elevation on the line indicated by 4—4, Fig. 3.

Fig. 5 is a fragmental elevation similar to Fig. 2 on a slightly larger scale, portions of the machine being shown in section and the parts being in the positions they occupy when the last is fully elevated and the pulling devices contracted.

Fig. 6 is a plan view of the pulling devices with the jaws in open position.

Fig. 7 is a plan view of the pulling devices, the jaws being in closed position.

In Figures 6 and 7 the upper ends of the levers for operating the pulling devices are indicated.

Figure 1:
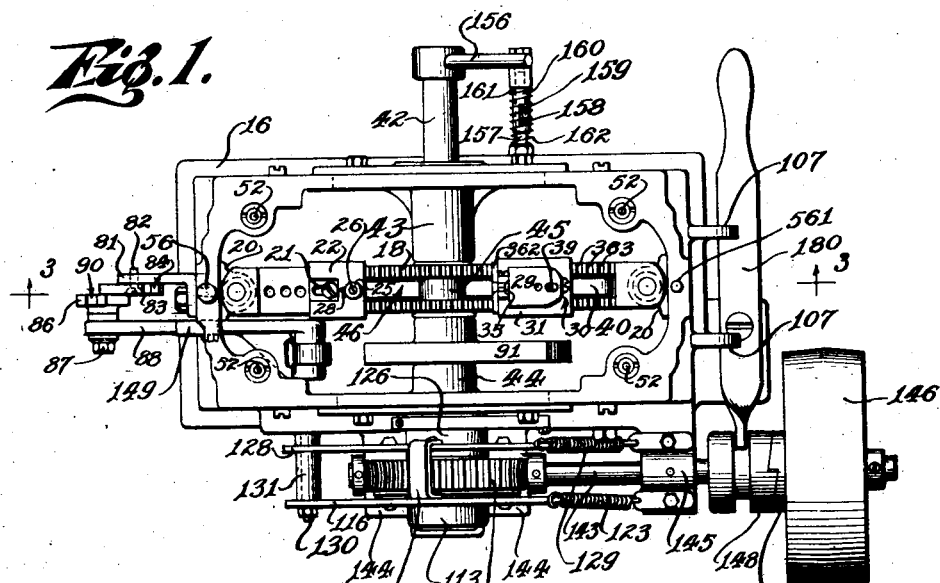
Figure 1 is a plan view of a machine built in accordance with the provisions of this invention, the plates and pulling devices being omitted.
Figure 2:
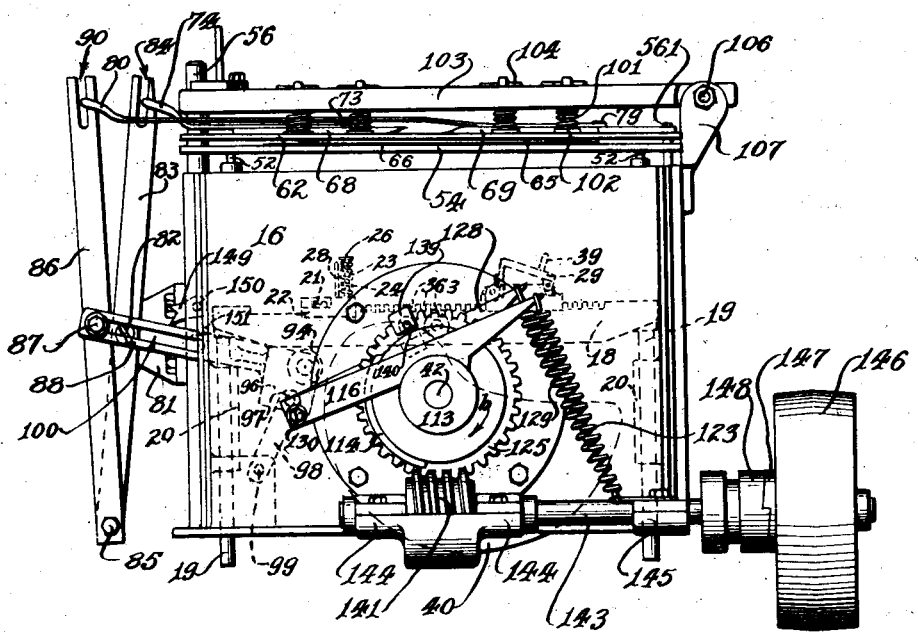
Fig. 2 is a front elevation of Figure 1, with the plates and pulling devices intact.

Fig. 8 is an enlarged front elevation of the clutch mechanism in Fig. 1, a portion of one of the cams being broken away to expose one of the clutch jaws.

Fig. 9 is a fragmental sectional detail on the line indicated by 9—9, Fig. 10.

Fig. 10 is an enlarged fragmental sectional elevation on the line indicated by 10—10 Figure 8.

Fig. 11 is an enlarged sectional detail on the arcuate line indicated by 11—11, Fig. 8.

Fig. 12 is a fragmental side elevation illustrating modifications in the invention to adapt it to the making of a shoe on the last, when inverted, said last being shown in section.

Fig. 13 is an enlarged edge view of the upper clamping plate.

Fig. 14 is a plan view of the clutch disengaging arms as they would appear when swung on their pivot into inverted position.

Fig. 15 is an enlarged plan detail of the latch for the pressure plate, the post with which the latch cooperates being shown in section and a fragment of the pressure plate being shown in plan.

Fig. 16 is an enlarged vertical section of the yielding support, its mounting and the resilient member therefor.

Fig. 17 is an edge view of a different form of pulling device for operating on the toe portion of a moccasin, the yoke being partly broken away.

Fig. 18 is a plan view of Fig. 17.

Fig. 19 is an edge view of a different form of pulling device for operating on the heel portion of a moccasin.

Fig. 20 is a plan view of Fig. 19.

Referring, first, more particularly to the form of the invention illustrated in Figs. 1 to 11 and 13 to 16 of the drawings, the last upon which the shoe is formed is indicated at 15 and it will be understood that said last may be of any desired size and that lasts of different sizes are interchangeable in the machine.

The frame of the machine is indicated at 16 and the last 15 is mounted on a carriage indicated in general at 17, said carriage being movably mounted with respect to the frame 16. The construction of the carriage will now be described.

There is provided a horizontal bar 18 having fixed in its opposite ends downwardly projecting guides 19 which slide in bearings 20 in the frame 16. Adjustably attached to the upper face of the bar 18 by a screw 21 is a block 22 carrying an upwardly projecting pin 23. The pin 23 is surrounded by a coil spring 24 which rests on the block 22 and which has its upper end engaging a washer 25 shiftably mounted on the pin 23. The spring 24 tends to force the washer 25 upwardly and a shoulder 27 on the pin 23 limits upward movement of the washer. When the last 15 is pressed upon the pin 11*

23, the point 26 of the pin enters the last, but the penetration of the point is limited by reason of the last coming in contact with the upper end of a stop 28 fixed in the block 22, the stop 28 being slightly shorter than the pin 23.

The toe of the last 15 rests upon a yielding support 29 which is movably connected by a universal joint 30 to a block 31. The universal joint is formed by a horizontal pivot 32 extending through one end of the support 29 and through a bearing 33 which is pivoted at 34 to one end of the block 31, the pivots 32, 34 being at a right angle to each other.

The support 29 is angular in shape and one leg thereof is provided with a stud 35 extending into a vertical slot 36 in the block 31. To one end of the block 31 is pivoted at 361 a dog 362 adapted to be selectively engaged with any one of a series of notches 363 in the upper face of the bar 18. Thus the block 31 is adjustable along the bar 18 to whatever position is required by the length of the last being used.

Between the support 29 and block 31, is interposed a resilient member 37 which, in this instance, is a piece of sponge rubber. Pressure upon the support 29 produces compression of the member 37 and permits such self-adjustment of the support as will bring its bend 38 and a pin 39, mounted therein, both into contact with the bottom of the last.

The bar 18 is caused to rise by a cam 40 secured by a key 41 to a shaft 42 which is journaled in bearings 43, 44 of the frame 16. The cam 40 preferably rides against a roller 45 rotatably mounted in a longitudinal slot 46 of the bar 18.

Detachably mounted on the frame 16 are leather-clamping means indicated in general by the character 47 and these means are preferably yieldingly mounted on the frame, and the clamping means and their mounting are constructed as follows:

Formed in the frame 16 are spring chambers 48, one of which is clearly shown in Fig. 5. In each spring chamber is a movable spring seat 49 resting upon an adjusting screw 50 which is screw-threaded through the bottom of the spring chamber. Supported on each of the spring seats 49 is a coil spring 51 having its upper end bearing against a shouldered plunger 52, the upward movement of the plunger being limited by reason of a shoulder 53 on the plunger engaging the upper wall of the spring chamber 48.

Resting on the plungers 52 is a supporting plate 54 having notches 55 at its opposite ends to receive posts 56, 561 which are screw-threaded into the upper edge of the frame 16. The posts 56, 561 function to prevent lateral movement of the plate 54 and also function as guides in any vertical movement of the plate 54.

The plate 54 is provided with an opening 57 and surrounding the opening is a recess 58 in which is detachably inserted a lower clamping plate 59 provided with an opening 60 concentric with the opening 57. Surrounding the opening 60 on the upper face of the plate 59 is an up-standing bead 61.

An upper clamping plate 62 is positioned above the plates 54, 59 and is provided at its ends with notches 63 fitting the posts 56, 561. The plate 62 is provided with an opening 64 of sufficient size to admit of the bead 61 entering said opening. The plate 62 is provided around the opening 64 with a bead 65 on its lower face. Consequently, the bead 65 is of somewhat larger diameter than the bead 61. When the plates 59, 62 are assembled, as in Figure 3, the beads 61, 65, are spaced sufficiently to accommodate the material which is to be applied to the last. In other words, the inside diameter of the bead 65 is slightly greater than the outside diameter of the bead 61. The beads are somewhat rounded so that the material being operated on will not be bent too sharply and cut when it is placed between the plates and pulled. Such material is indicated in Figure 3 by the character 66, and it will be seen that it covers the opening 60 and protrudes through the opening 64 when the last is in the position shown. By referring to Figure 13, it will be seen that the bead 65 is higher along certain portions of the sides than at the other portions, the higher bead portions being indicated at 67. It will be understood that these higher bead portions 67 may be provided at any desired position around the opening 64 and the advantage of this construction will be made clear hereinafter.

Removably mounted on the plate 62 are heel and toe pulling or wiping devices 68, 69, shown clearly in Figs. 6 and 7. The heel pulling or wiping device 68 is constructed as follows:

There are provided complementary jaws 70 pivotally connected at 71. When the jaws 70 are open, as in Figure 6, they define a heel-receiving recess 72 of somewhat larger size than the heel portion of the last. Pivotally connected at 73 to the outer margins of the jaws 70 is a U-shaped yoke 74 of spring material. When the jaws 70 are open the pivot 71 is rearwardly of a line connecting the pivots 73, and the yoke 74 is under compression when the jaws are open, so that the spring power of the yoke will tend to keep the jaws in open position as in Figure 6.

The pulling or wiping device 69 is similar in construction to the device 68, though the parts are reversed in relation to the last. The construction is as follows: Jaws 75 are pivotally connected at 76, the jaws when open forming a toe-receiving recess 77 of somewhat greater width than the toe portion of the last. The rear ends of the jaws 75 form abutting stops 78 when the jaws are in the open position shown in Figure 6. Pivotally connected at 79 to the outer margins of the jaws 75 is a U-shaped yoke 80 constructed of spring material, the pivot 76 being rearward of a line connecting the pivots 79 when the jaws are open, and the yoke 80 being under compression so that said yoke will tend to hold the jaws in the open position.

The pulling or wiping devices will be operated to close the jaws by suitable mechanism constructed, in this instance, as follows: The frame 16 is provided at one end with a bracket 81 to which is pivoted at 82 a lever 83 having a notch 84 at its upper end. The intermediate portion of the yoke 74 releasably engages the notch 84. The lower end of the lever 83 is pivoted at 85 to a second lever 86 which is adjustably pivoted at 87 to a push rod 88 that passes through an opening 89 in the frame 16. The upper end of the lever 86 is provided with a notch 90 in which is detachably positioned the intermediate portion of the yoke 80.

It will be understood that the levers 83, 86 constitute pressure equalizing means as will be made clear hereinafter in the description of the operation of the machine. The push rod 88 is thrust outwardly by a second cam 91 secured by a set screw 92 to a tubular shaft 93 through which the shaft 42 extends. The cam 91 preferably rides against a roller 94 journaled in a slot 95 in the inner end of the rod 88. The rod 88 has a downwardly projecting leg 96 to which is pivoted at 97 a link 98 that in turn is pivoted at 99 to the frame 16. The pivot 87 is formed by a bolt which is adjustable to different positions within a longitudinal slot 100 in the rod 88. Different lengths of travel of the yokes 74, 80, are secured by securing the pivot 87 in different positions along the rod 88.

The plate 62 is yieldingly held toward the plate 59 by coil springs 101 pressing against plungers 102 which seat against the upper face of the plate 62. The plungers 102 are slidably mounted in a pressure plate 103 against which the upper ends of the springs 101 rest. Thus the springs 101 tend to force the plungers 102 downwardly with respect to the plate 103. Shoulders 104 formed, in this instance, by cotter pins in the upper ends of the plungers 102 limit downward movement of the plungers relative to the plate 103, said shoulders engaging the upper face of the plate 103.

The plate 103 is provided with an opening 105 concentric with the openings 60, 64, and somewhat larger. The plate 103 is pivoted or hinged at one end at 106 to upstanding ears 107 of the frame 16. The plate 103 can thus be swung upwardly and outwardly so that the pulling devices 68, 69 and plates 54, 59 and 62 can be removed. The other end of the plate 103 is detachably secured to the post 56 by a suitable latch constructed as follows:

Pivoted at 108 to the upper face of the plate 103 is a latch 109 having a fork 110 adapted to engage notches 111 formed in opposite sides of the post 56. The springs 51, 101 will preferably be under a slight tension when the latch 109 is engaged with the post 56.

The mechanism for operating the cams 40, 91 in proper timed relation will now be described. The shaft 42 is secured by a pin 112 to a collar 113 which is provided with a cam 114. The collar 113 has an annular groove 115 in which is inserted the lower edge of an arm 116. Extending longitudinally in the collar 113 is a hole 117 in which is slidably mounted a clutch pin 118. The pin 118 is provided with a notch 119, the outer wall of the notch being preferably beveled as indicated at 120. The slanting face 120 is adapted, when the collar 113 turns, to be engaged by a beveled face 121 formed on the lower edge of the arm 116, as clearly shown in Figure 14. The pin 118 is normally pressed inwardly by a coil spring 122 positioned in the hole 117. It will be seen that, when the arm 116 is in the groove 115, rotation of the collar 113 brings the pin 118 into engagement with the arm 116 so as to cause retraction of the pin against the pressure of the spring 122. The arm 116 is yieldingly held in position in the groove 115 to engage the pin 118 by a spring 123 connected at one end to the arm 116 and at its other end to the frame 16. When the collar 113 is turned sufficiently far to move the pin 118 past that portion of the arm 116 within the groove 115, the spring 122 forces the pin 118 to the left in Fig. 11 to cause it to project beyond the inner face of the collar 113 and into the path of movement of clutch jaws 124 formed in the outer end of the hub of a worm gear 125, which is loose on the shaft 42 adjacent the collar 113.

The tubular shaft 93 is provided with a collar 126 adjacent the hub of the gear 125 and said collar is provided with an annular groove 127 adapted to receive the lower edge of an arm 128 which is yieldingly held in the groove by a spring 129 secured at one end to the arm 128 and at its other end to the frame 16. Both arms 116, 128 are pivotally mounted at 130 on one side of the frame 16, a spacing sleeve 131 on the pivot 130 holding the arms 116, 128 in proper spaced relation so as to register with the grooves 115, 127 respectively.

The collar 126 is provided with a longitudinally extending hole 132 in which is slidably mounted a clutch pin 133 that is yieldingly held in position to project beyond the outer face of the collar 126 by a coil spring 134 mounted in the hole 132. When the pin 133 is projected from the collar 126, the projecting end lies within the path of movement of clutch jaws 135 formed in the inner end of the hub of the gear 125. The clutch pin 133 is provided with a notch 136 and the inner wall of said notch is preferably beveled, as indicated at 137, for engagement by the beveled face 138 formed on the lower edge of the arm 128 as clearly seen in Figure 14.

It will be clear that, when the arm 128 is in its lowered position in the groove 127, the clutch pin 133 will be withheld by said arm from engagement with any of the clutch jaws 135 as the gear 125 rotates. If, however, the arm 128 be raised out of engagement with the pin 133, the spring 134 will project said pin from the collar 126 so that one of the clutch jaws 135, as the gear 125 rotates, will engage said pin and produce rotation of the collar 126, shaft 93 and cam 91. In order to raise the arm 128 at a predetermined instant with respect to the position of the cam 40, the arm 128 is provided with a laterally projecting portion 139 carrying a roller 140 adapted to ride on the cam 114. The cam 114 is constructed so as to effect raising of the arm 128 during the later part of the upward movement of the carriage 17.

The worm gear 125 is driven by a worm 141 which is secured by a key 142 to a shaft 143 journaled in bearings 144, 145 in the frame 16. The shaft 143 is provided with a loose pulley 146 and the hub of said pulley constitutes one member 147 of a jaw clutch, the other clutch member being indicated at 148. The clutch member 148 is shifted by any suitable means, 180, so that the shaft 143 can be driven or not as desired.

Means are provided to latch the rod 88 in the outermost position to which it is moved by the cam 91, and these means comprise a detent 149 pivoted at 150 to the frame 16 and adapted to engage a notch 151 in the upper face of the rod 88. Gravity, in this instance, holds the detent 149 in position to engage the arm as said arm is moved outwardly. As soon as the notch 151 has moved into registration with the detent 149, said detent falls into the notch and, upon further rotation of the cam 91, the rod 88 will be held by the detent 149 against inward movement, thus holding the jaws of the pulling devices closed against the expansive force of the yokes 74, 80, when the rod 88 has been operated to its extreme position by the cam 91.

In order that the shaft 42 may be turned by hand to rotate the collar 113 sufficiently to move the clutch pin 118 out of engagement with the arm 116 so as to initiate raising of the carriage 17, the shaft 42 is provided with an arm 156.

A stop is preferably provided to engage the arm 156 to insure against rotation of the shaft 42 when the clutch elements 118, 124 are disengaged, since friction produced by the rotating gear 125 might possibly turn the shaft 42 slowly and thereby release the clutch element 118 from the arm 128. The stop is constructed as follows:

Projecting from the side of the frame 16 toward the path of rotation of the arm 156 is a stud 157 provided with a pin 158 which enters a slot 159 in a sleeve 160 to limit outward movement of the sleeve. Surrounding the sleeve between an external shoulder 161 thereof and the frame 16 is a coil spring 162 which tends to hold the sleeve in the path of travel of the arm 156. To disengage the arm 156 from the sleeve 160, said sleeve will be forced inwardly to compress the spring 162.

To make a shoe in accordance with this new method, the machine described above operates as follows:

The latch 109 will be released and the plate 103 raised, then the pulling devices 68, 69 will be removed and, finally, the plate 62 will be detached. It is to be understood that, though but one size of each of the plates 59, 62 is shown, said plates will be made with different sizes of the beads 61, 65 according to the sizes of the shoes to be made. The desired plate 59 being in place in the recess 58, and the cam 40 being in position to hold the carriage 17 in its most elevated position, the last 15 will be placed in position on the pin 23 and block 29 as clearly shown in figure 3 of the drawings. It is to be understood that any size and style of last may be used, according to the style and size of the shoe to be made. Before placing the last on the pin 23 said last may or may not be covered with a piece of lining material, as desired, and such lining is indicated at 163 in Fig. 3. Also, preferably, an insole, indicated in Fig. 3 at 164 will be basted to the last or to the sole portion of the lining by nails 165. Then the bottom face of the insole 164 will be coated with a suitable rubber or leather cement.

After the last has been placed in position, the handle 156 will be turned by the operator to rotate the shaft 42 clockwise in Figure 3 of the drawings so as to rotate the cam 40 in the direction of the arrow $b$. As soon as the high point of the cam 40 has been turned out of engagement with the roller 45 the carriage 17 will descend to its lowest position due to the action of gravity thereon.

The operator then coats the marginal portions of a piece of pliable material with rubber or leather cement and places said material upon the plate 59 with the cement side down and the middle portions extending across the opening 60. This material may be leather or any other material suited for drawing over the last or equivalent shaping member, and it is to be understood that where the term leather is employed in this specification, such term defines not only leather but also any other material suited to the purpose.

The leather 66 having been placed as described, the plate 62 will be positioned with its bead 65 resting on the leather 66 adjacent the bead 61 of the plate 59. Then the lasting device 68 will be placed on the plate 62 and its yoke 74 will be engaged with the notch 84 of the lever 83. Then the lasting device 69 will be placed in position on the plate 62 with its yoke 80 overlying the marginal portions of the jaws 70. The yoke 80 will be inserted in the notch 90 of the lever 86. The plate 103 will then be placed in position with the plungers 102 resting on the plate 62 and the latch 109 will be engaged with the notches 111 of the post 56 so as to prevent upward movement of all of the plates.

If the operator turn the arm 156, as above described, but slightly, the high point of the cam 40 will disengage the roller 45 but the collar 113 will not be turned sufficiently to disengage the pin 118 from the arm 116. Consequently the pin 118 will be held in the retracted position by said arm as shown in Figure 11 and the shaft 42 will remain stationary when the operator releases the arm 156.

Assuming that power is applied to the pulley 146 and that the clutch members 147, 148 are engaged, the operator will now turn the arm 156 still further in the same direction as before to turn the collar 113 sufficiently to move the pin 118 out of engagement with the arm 116, thus permitting said pin to be engaged by the rotating gear 125. This of course turns the shaft 42 and the cam 40. Turning of the cam 40 raises the carriage 17 to bring the last 15 into engagement with the leather 56 somewhat as indicated in Figure 3. The marginal portions of the leather 66 are yieldingly held by the clamping plates 59, 62 and, as the last moves upwardly, it pulls the leather 66 while said leather is held taut by the clamping plates. As the last rises the leather 66 is caused to conform more or less to the shape of the last. By the time that the high point of the cam 40 reaches the roller 45, the collar 113 has rotated sufficiently to again bring the pin 118 into engagement with the arm 116, thus withdrawing said pin from engagement with the gear 125, whereupon the shaft 42 will cease to operate and the carriage 18 will be held in its maximum raised position.

During the later part of the upward movement of the carriage 18, the cam 114 functions to raise the roller 140 thus causing disengagement of the arm 128 from the clutch pin 133. This, of course, permits the clutch pin 133 to be engaged by the rotating gear 125 so as to drive the tubular shaft 93 and with it the cam 91. Turning of the cam 91 causes outward movement of the rod 88 so as to actuate the lever 86. The movement of the lever 86 also produces movement of the lever 83, and these movements effect pulling upon the yokes 80, 74, respectively. Pulling of the yoke 80 causes the jaws 75 to move toward each other so as to slidably engage the leather 66 and pull or wipe it snugly around the toe portion of the last, thus stretching and shaping the leather to the last. The jaws 75 can be thus operated because by this time the pin 39 is elevated to the level of said jaws and engages said jaws at their point of juncture. Pulling of the yoke 74 causes movement of the jaws 70 toward each other so as to slidably engage the portion of the leather 66 adjacent the heel of the last to wipe the leather around the heel portion of the last and thus cause said leather to conform closely to the last. The jaws 70 can be thus operated because by this time the stop 28 is elevated to the level of said jaws and engages said jaws at their point of juncture. The lever 86 is, in reality, a floating lever and it will be readily understood that, if the resistance to closing of either pulling device, due in part to the friction on the leather of the clamping plates and in part to the resistance of the leather to stretching, is in excess of that of the other, the lever which operates the pulling device exerting the least resistance will begin to operate first. As soon as the operated pulling device meets with a resistance equal to that met with by the other (inactive) pulling device, the lever connected with the latter device will also begin to operate.

It is often desirable to produce greater stretching of the leather at certain portions than at others and this is effected by reason of the increased height of the bead 65 at those portions where the greater degree of stretching is to be effected as, for example, across the instep of the last; and, in such event, the bead 65 will be increased in height adjacent the sides of the instep as indicated at 67 in Figure 13.

The carriage having reached its uppermost position and having stopped, the cam 91 continues to turn until the high point of said cam engages the roller 94. During the later part of the movement engendered by the cam 91, the jaws of the pulling devices 68, 69 pull the marginal portions of the leather 66 beneath the last into contact with the coating of cement on the bottom face of the lining or insole, as the case may be. Thus, said marginal portions will be caused to adhere to the lining or insole. The leather 66 will preferably be of such size and shape that the marginal portions will substantially abut one another so that there will be no unevenness in the sole of the shoe. It will be noted that the relative movement between the leather holding means and the last is in a plane normal to the plane of the bottom of the last and that the path of motion of the wiping device is normal to the path of said relative movement.

When the cam 91 has been turned to bring its high point into engagement with the roller 94, as indicated in Figure 5, the detent 149 will engage the notch 151 in the rod 88 so that, upon further rotation of the cam 91, the yokes of the pulling devices will be maintained in their jaw-closing positions against the pressure tending to open the jaws produced by the tension of the stretched leather. As soon as the cam 91 rotates sufficiently to leave the roller 94, it stops because of the clutch pin 133 being retracted by engagement with the arm 128; and the shaft 42 being stationary at this time the cam 114 cannot effect raising of the arm 128. When the detent 149 clicks into the notch 151, the operator may release the latch 109 and swing up the plate 103. He then removes the pulling devices and the plate 62. Finally he removes the last with the leather stretched thereon. The upper thus produced by the machine will then be finished by cutting an opening in the shoe for the admission of the foot and the shoe will be stitched in the usual manner and an outer sole applied and also a heel if so desired.

In Figure 12 of the drawings the bar 18 is provided with a block 152 which is substituted for the block 22 and which is secured to the bar 18 in the same manner. This block 152 is provided with an upwardly projecting pin 153 and surrounding said pin is a coil spring 154. When it is desired to invert the last 15, as shown in Figure 12, a socket 155 formed in the heel portion of the last will be placed over the pin 153, the heel portion of the last being yieldingly supported by the spring 154. The toe of the last when inverted will be yieldingly supported by the support 29, the pin 39 having been removed from said support.

The only other element of the machine that need be changed, when operating with the last in inverted position, is the lifting cam. It will be noted that the contour of the cam 40 is such as to effect a continuous upward movement of the carriage. Instead of using the cam 40, there will be substituted for it a cam 166 having a portion 167 of its periphery concentric with the shaft 42 so as to effect a dwell in the upward movement of the carriage. The reason for this is to permit the jaws 75 to be translated to position beneath the toe portion of the last to properly pull and stretch the leather around the toe and instep of the last.

It will be understood that, in making a shoe with the last inverted, as in Figure 12, the same operations previously described will be performed, excepting that the marginal portions of the leather will not be coated with cement. A complete sole, without division thereof, is produced by the leather when it is stretched upon the last, since the sole of the last is turned uppermost and thus engages the middle portion of the leather as the carriage rises. Shoes can thus be cheaply made for children without any seams and with a very light weight sole. If, however, a heavier sole is desired, an outer sole may be stitched or otherwise secured to the sole that is integral with the upper of the shoes thus made.

Now referring more particularly to Figs. 17 and 18, the yoke 80, shown fragmentarily, is secured by pins 167 to the marginal portions of a member 168 having stationary jaws 169 defined by a recess 170 adapted to receive the toe portion of the last. The margin of the recess is formed by an upwardly extending flange 171. Referring to Figs. 19 and 20, a pair of movable jaws 172 are pivotally connected at 173 and define at their forward portions a recess 174 adapted to receive the heel portion of the last. The rear portions of the jaws 172 are spaced to receive a coil spring 175, the ends of which engage studs 176 on the inner edges of the jaws, so that the expansion of the spring will tend to close the jaws. The jaws are held open, against the pressure of the spring, by a latch 177 hinged at one end at 178 to the forward portion of one of the jaws and having its other end releasably engaging a hole 179 in the forward portion of the other jaw.

The parts shown in Figs. 17 to 20 and described above, when substituted for the jaws 70, 75 to make a moccasin, operate as follows: The lever 86 causes translation of the member 168 to move the jaws 169 toward the instep of the last as the last rises, said last being, for example, in the inverted position shown in Fig. 12; thus to pull or wipe the leather around the toe and instep of the last. When the last has risen to a predetermined level, the heel thereof strikes the latch 177 and kicks said latch out of engagement with the hole 179, thus permitting the spring 175 to contract the jaws 172 toward the heel portion of the last, thereby pulling or wiping and stretching the leather around the heel.

In order to simplify this specification, it is to be understood that, wherever the term shoe is employed, said term also defines moccasin, slipper or any other covering for the foot.

Mention has hereinbefore been made of a lining on the last. It is to be understood that such lining may be applied to the last separately by this machine before the outer leather is applied or that the lining may be clamped between the plates 59, 62 with the leather so that said lining and leather will be operated on simultaneously by the machine to shape them to the last.

I claim:

1. In a shoe machine, the combination of means to hold a piece of leather, a bar, a last, means on the bar to support one end of the last, means shiftable along the bar to support the other end of the last, means to releasably lock the shiftable supporting means in different positions along the bar, and means operating to effect relative motion between the last and the leather holding means.

2. In a shoe machine, the combination of means to hold a piece of leather, a bar, a last, means on the bar to support one end of the last, a block on the bar, a support for the other end of the last connected by a universal joint to the block, and means operating to effect relative motion between the last and leather holding means.

3. In a shoe machine, the combination of means to hold a piece of leather, a last, a block, a support for the last connected by a universal joint to the block, resilient means between the block and support, and means operating to effect relative motion between the last and leather holding means.

4. In a shoe machine, the combination of means to yieldingly hold a piece of leather tighter at portions of its side margins than at other portions of said margins, said means including a rib having portions of different heights, a last, and means operating to pull the leather around the last.

5. In a shoe machine, the combination of means to hold a piece of leather, a last, means to produce relative movement of the leather-holding means and last toward one another, a wiping device adjacent the toe of the last, a second wiping device adjacent the heel of the last, and means including pressure-equalizing means to move said wiping devices toward the last.

6. In a shoe machine, the combination of a yieldingly mounted supporting plate having an opening, a last, means to move the last to and from the opening, a leather-clamping plate provided with an opening registering with the first mentioned opening and detachably seated on the supporting plate, a second leather clamping plate provided with an opening to register with the first mentioned opening, means on the adjacent faces of the clamping plates to grip a piece of leather, and means yieldingly pressing the second clamping plate toward the first clamping plate.

7. In a shoe machine, the combination of a yieldingly mounted supporting plate having an opening, a last, means to move the last to and from the opening, a leather-clamping plate provided with an opening registering with the first mentioned opening and detachably seated on the supporting plate, a second leather-clamping plate provided with an opening to register with the first mentioned opening, means on the adjacent faces of the clamping plates to grip a piece of leather, a fourth plate movably secured above the second clamping plate and provided with an opening to register with the first mentioned opening, and yielding means carried by the fourth plate engageable with the second clamping plate.

8. A shoe machine comprising a last, leather-holding means adapted when in one position relative to the last to surround said last, said means including upper and lower clamping plates provided with openings and with beads surrounding the openings, said means being operable to hold a piece of leather stretched over the last, means to produce relative movement of the leather-holding means and the last to bring the leather around the sides of the last, said movement being in a plane normal to the plane of the bottom of the last, wiping devices adjacent to the toe and heel of the last, and means to move the wiping devices toward the last during said relative movement, the path of motion of the wiping device being normal to the path of said relative movement.

Signed at Los Angeles, California, this 10th day of April, 1922.

SAMUEL STRAUSS.